United States Patent
Wilcox et al.

(10) Patent No.: US 12,188,548 B2
(45) Date of Patent: Jan. 7, 2025

(54) INTEGRATED GEARBOX LOCKOUT DEVICE

(71) Applicant: Textron Innovations Inc., Providence, RI (US)

(72) Inventors: Matthew M. Wilcox, Fort Worth, TX (US); Jacob P. Speed, Cullman, AL (US); Cody C. Anderson, Lantana, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/392,942

(22) Filed: Dec. 21, 2023

(65) Prior Publication Data
US 2024/0125378 A1 Apr. 18, 2024

Related U.S. Application Data

(63) Continuation of application No. 17/885,034, filed on Aug. 10, 2022, now Pat. No. 11,859,706.

(51) Int. Cl.
*F16H 57/02* (2012.01)
*F16H 57/00* (2012.01)

(52) U.S. Cl.
CPC ..... *F16H 57/02* (2013.01); *F16H 2057/0093* (2013.01)

(58) Field of Classification Search
CPC ............ F16H 57/02; F16H 2057/0093; F16H 2057/02017; F16H 2057/0056
USPC ............... 403/314, 370, 374.3, 369
See application file for complete search history.

(56) References Cited

U.S. PATENT DOCUMENTS

| | | | | |
|---|---|---|---|---|
| 3,957,381 A | * | 5/1976 | Schafer | F16D 1/093 416/244 R |
| 4,304,502 A | * | 12/1981 | Stratienko | F16D 1/094 403/370 |
| 4,371,360 A | | 2/1983 | Ojima et al. | |
| 4,922,599 A | * | 5/1990 | Durfee | F16H 57/02 29/445 |
| 5,042,749 A | * | 8/1991 | Jacques | B64C 3/56 244/99.2 |

(Continued)

FOREIGN PATENT DOCUMENTS

WO WO 2013020541 2/2013

OTHER PUBLICATIONS

Steelman socket adapter, 2019, https://www.amazon.com/STEELMAN-60562-1-Inch-Square-Adapter/dp/B07NGSSHMY?th=1 (Year: 2019).*

(Continued)

*Primary Examiner* — Thomas C Diaz
(74) *Attorney, Agent, or Firm* — Frost Brown Todd LLP

(57) ABSTRACT

Methods and systems are described for a gearbox lockout device. It may be desirable in certain vehicles to lock a drive shaft within a gearbox for a period of time. Lockout embodiments under the present disclosure include a shaft configured to selectively engage the drive shaft via teeth. An inner and outer collar surrounding the shaft can be manipulated to restrict the movement of the shaft once the shaft's teeth are engaged with the teeth of the drive shaft. The system can be torqued up and locked in place. This can allow for more safe transporting of the vehicle, easier maintenance, or other advantages.

17 Claims, 14 Drawing Sheets

(56) References Cited

U.S. PATENT DOCUMENTS

| 5,286,232 A | * | 2/1994 | Engle | F16H 57/04 |
| | | | | 464/154 |
| 6,098,753 A | * | 8/2000 | Lamarre | F01D 25/183 |
| | | | | 277/579 |
| 2015/0102033 A1 | | 4/2015 | Banovic | |
| 2021/0123518 A1 | | 4/2021 | Wojtalik et al. | |

OTHER PUBLICATIONS

European Search Report dated 01-230-2024 for Application No. EP 23181165.4, 4 pages.

\* cited by examiner

INTEGRATED GEARBOX LOCKOUT DEVICE

CROSS REFERENCE TO RELATED DATA

This application is a continuation of U.S. patent application Ser. No. 17/885,034, filed Aug. 10, 2022, titled "Integrated Gearbox Lockout Device", now U.S. Pat. No. 11,859,706 the contents of which are hereby incorporated herein in its entirety.

TECHNICAL FIELD

The present disclosure generally relates to drivetrains for aircraft.

BACKGROUND

It is often necessary for the drive train of an aircraft to be mechanically locked (unable to rotate) for certain maintenance procedures and during transportation to prevent damage. On many rotorcraft transmissions, locking out of the device requires the installation of separate support equipment that typically bolts on a gearbox case. In some situations, the gearbox needs to be opened up and exposed to atmosphere to access a locking location. Some methods include the removal of a sealed cover over the interconnecting drive train section of the gearbox, and the installation of a tool that consists of a screw drive to lock the drive train. But there are problems with the prior solutions. The removal of the sealed cover significantly increases the risk of corrosion due to the environment exposure and possible water intrusion. The process requires a tool that is expensive to procure and is large/heavy.

SUMMARY

One embodiment under the present disclosure comprises a lockout device for a gearbox. The device comprises a housing comprising a hole therethrough and configured to be fixedly coupled to the gearbox; a cover detachably coupled to the housing; and a shaft detachably coupled to the cover and configured to pass through the hole, the shaft comprising a plurality of teeth at one end and a receiving slot on a distal end, the plurality of teeth configured to engage a portion of a drive train within the gearbox and transmit rotation from the shaft to the drive train. It further comprises an inner collar configured to sit around the shaft and at least partially between the shaft and the housing, the inner collar comprising a plurality of threadless holes; and an outer collar configured to sit around the shaft and at least partially between the inner collar and the housing, the outer collar comprising a plurality of threaded holes configured to receive a plurality of bolts passing through the plurality of threadless holes, wherein rotation of the plurality of bolts can adjust the relative position of the inner collar and the outer collar, wherein as the inner collar and the outer collar are pulled closer together the inner collar is pushed against the shaft and restricts a displacement of the shaft within the hole.

Another embodiment can comprise an apparatus for torquing and locking a drive train within a gearbox. The apparatus comprises a shaft translatable along its axis between engagement with the drive train and a plurality of distal positions, the shaft comprising a first plurality of teeth configured to be coupled to a second plurality of teeth on the drive train and to transmit torque and motion in the shaft to the drive train; and an inner collar coupled around the shaft and comprising a plurality of threadless holes configured to receive a plurality of threaded coupling members therethrough. It further comprises an outer collar coupled at least partially exterior to the inner collar and comprising a plurality of threaded holes configured to receive the plurality of threaded coupling members therethrough, wherein rotation of the plurality of threaded coupling members adjusts the relative position of the inner collar and the outer collar, wherein pulling the inner collar and the outer collar together causes the inner collar to restrict the translation of the shaft along its axis; and a housing disposed at least partially exterior to the outer collar and coupled to the gearbox and to the inner collar.

A further embodiment comprises a method of performing a lockout operation to torque and lock a drive train within a gearbox. The method comprises unscrewing a cover from its coupling to a housing, the housing comprising a hole therethrough and configured to be fixedly coupled to the gearbox; and uncoupling the cover from a shaft, the shaft configured to pass through the hole and comprising a first plurality of teeth at one end and a socket head on a distal end, the shaft configured to be translatable along its axis, wherein coupling the shaft to the cover prevents the shaft from engaging the drive train. Further steps include manipulating the shaft so as to engage a second plurality of teeth on the drive train with the first plurality of teeth so as to transmit rotation from the shaft to the drive train, and applying a torque to the drive train by rotating the socket head. A further step is rotating a plurality of threaded bolts coupled to a plurality of threadless holes in an inner collar and a plurality of threaded holes in an outer collar, the inner collar configured to sit around the shaft and at least partially between the shaft and the housing, the outer collar configured to sit around the shaft and at least partially between the inner collar and the housing, wherein rotating the plurality of threaded bolts can adjust the relative position of the inner collar and the outer collar, wherein as the inner collar and the outer collar are pulled closer together the inner collar is pushed against the shaft and restricts a displacement of the shaft within the hole.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

The present disclosure includes embodiments for an integrated gearbox lockout device that improves upon the prior art and solves the problems associated with prior approaches. Certain embodiments can utilize keyless locking technology to keep a gearbox from rotating when the lockout device is engaged. Furthermore, embodiments of the lockout device can remain installed on the gearbox and perform its functions while maintaining a seal between the environment and the internals of the gearbox.

Benefits of embodiments under the present disclosure include, but are not limited to:

A locking device that is integral to the gearbox, is externally accessible, and maintains a sealed gearbox environment throughout all modes of operation;

A keyless design that allows the locking system to slip torsionally above a specified torque threshold without the creation of foreign object damage (FOD) or damaging components (prevents damage to other components if inadvertently left engaged);

A sliding shaft that can be engaged or disengaged through external input; by allowing disengagement, no direct lubrication is required, and components do not wear during aircraft operation;

A fail-safe feature that manually prevents the sliding shaft from engaging while the aircraft is in operation;

A compact, self-contained design that can be retrofitted onto fielded gearboxes and replaced in the field without impacting other gearbox internals; and Specific packaging that prevents FOD from getting into the gearbox even in the event of component failure.

Figure 1:
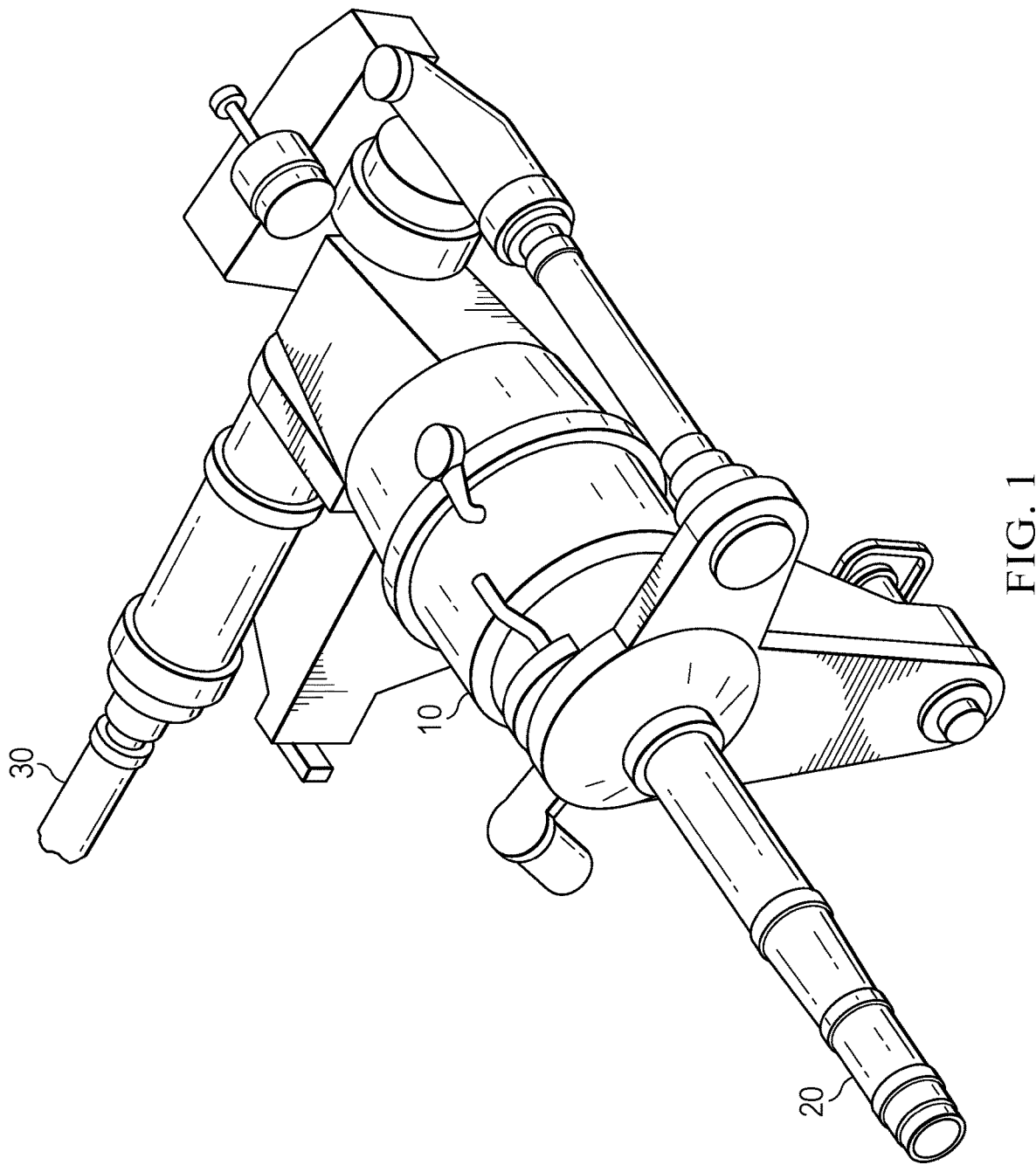
FIG. 1 shows a drive system for a tilt rotor aircraft.

One embodiment of a gearbox and drive shaft for a tilt rotor aircraft is shown in FIG. 1. Gearbox 10 contains multiple gears that can provide power to drive train 20. Second drive train 30 can couple gearbox 10 to a central drive system of an aircraft. At certain times, such as during maintenance procedures, or shipping to another location, it may be desirable to lock gearbox 10 and/or drive train 20 such that drive train 20 is not capable of rotating by itself or of being moved by the gears within gearbox 10.

Figure 2:
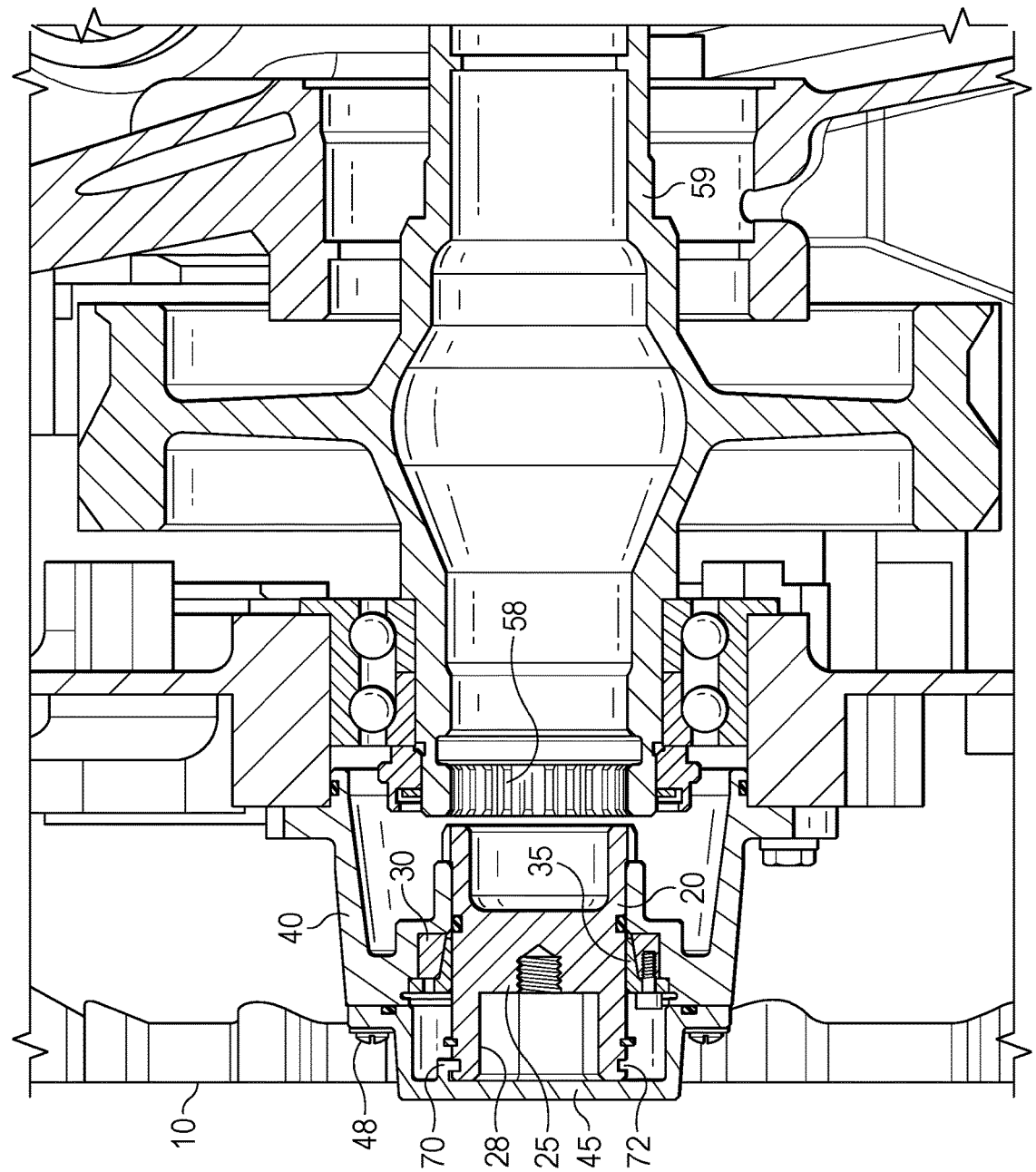
FIG. 2 shows a cut away view of a lockout device and gearbox embodiment under the present disclosure.

One embodiment of a lockout device under the present disclosure is shown in FIG. 2. FIG. 2 shows a cut-away view of a lockout device 20 coupled to a gearbox 10, similar to the gearbox 10 of FIG. 1. Lockout device 20 comprises shaft 25, outer collar 30, inner collar 35, housing 40, and cover 45. Screws 48 couple cover 45 to housing 40. While the aircraft is in use (or is otherwise not in a lockout operation) cover 45 will preferably be kept in place to protect housing 40 and shaft 25 from wear and tear. When a user wishes to perform a lockout operation, cover 45 can be removed by removing screws 48. When not in a lockout operation, shaft 25 with teeth 27 will sit to the left (in the view of FIG. 2) of teeth 58 of drive train 59. When a user performs a lockout operation, cover 45 is removed and then shaft 25 can be pushed to engage teeth 58. Socket head or receiving slot 28 in shaft 25 can receive a socket wrench operated by a user. The user can use the socket wrench to push in shaft 25 to engage teeth 58 with teeth 27, and then to rotate the shaft 25 (and by extension the gearbox 10) so as to torque up gearbox 10 and then restrain further movement during the lockout operation.

Figure 3:
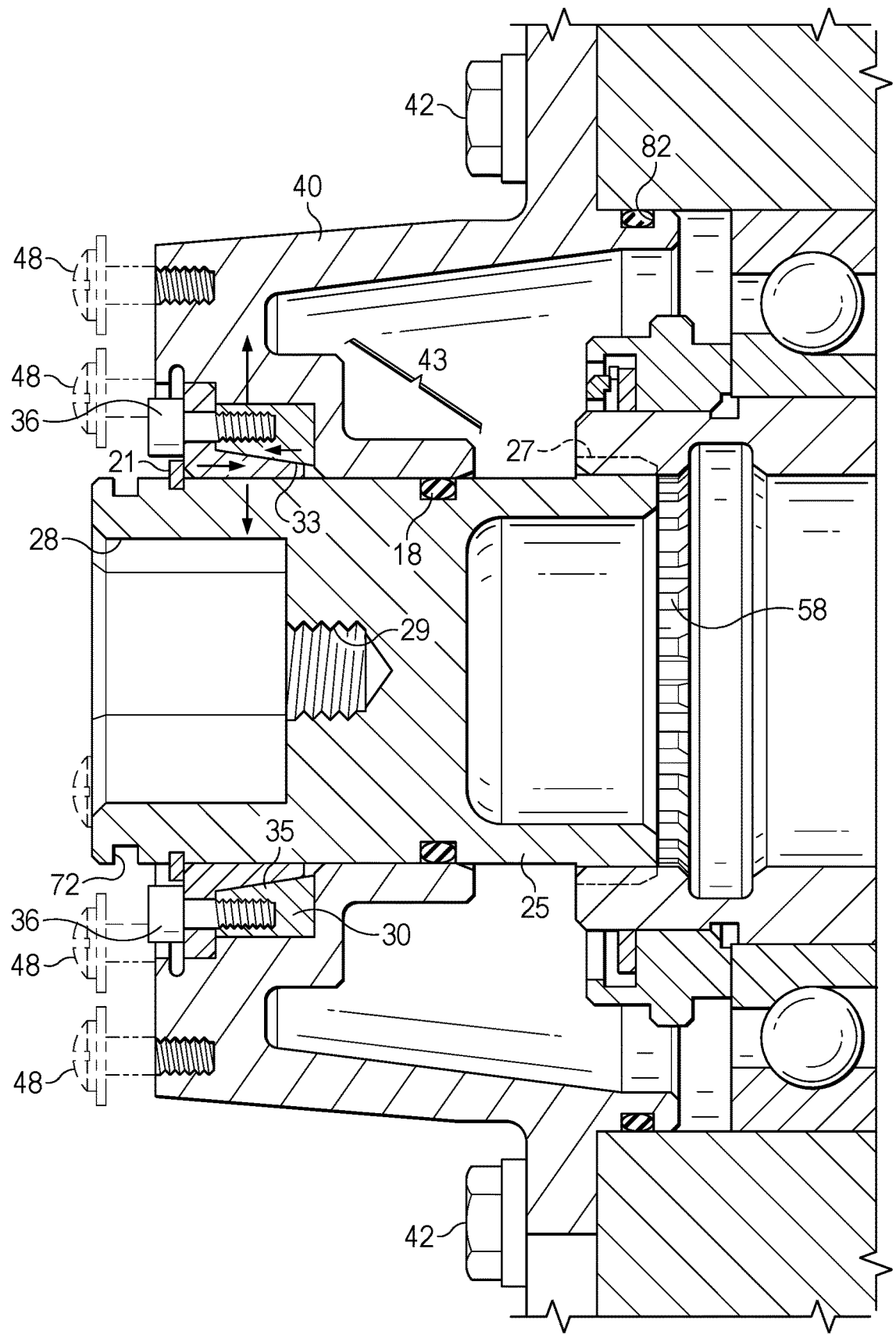
FIG. 3 shows a cut away view of a lockout device and gearbox embodiment under the present disclosure.
Figure 4:
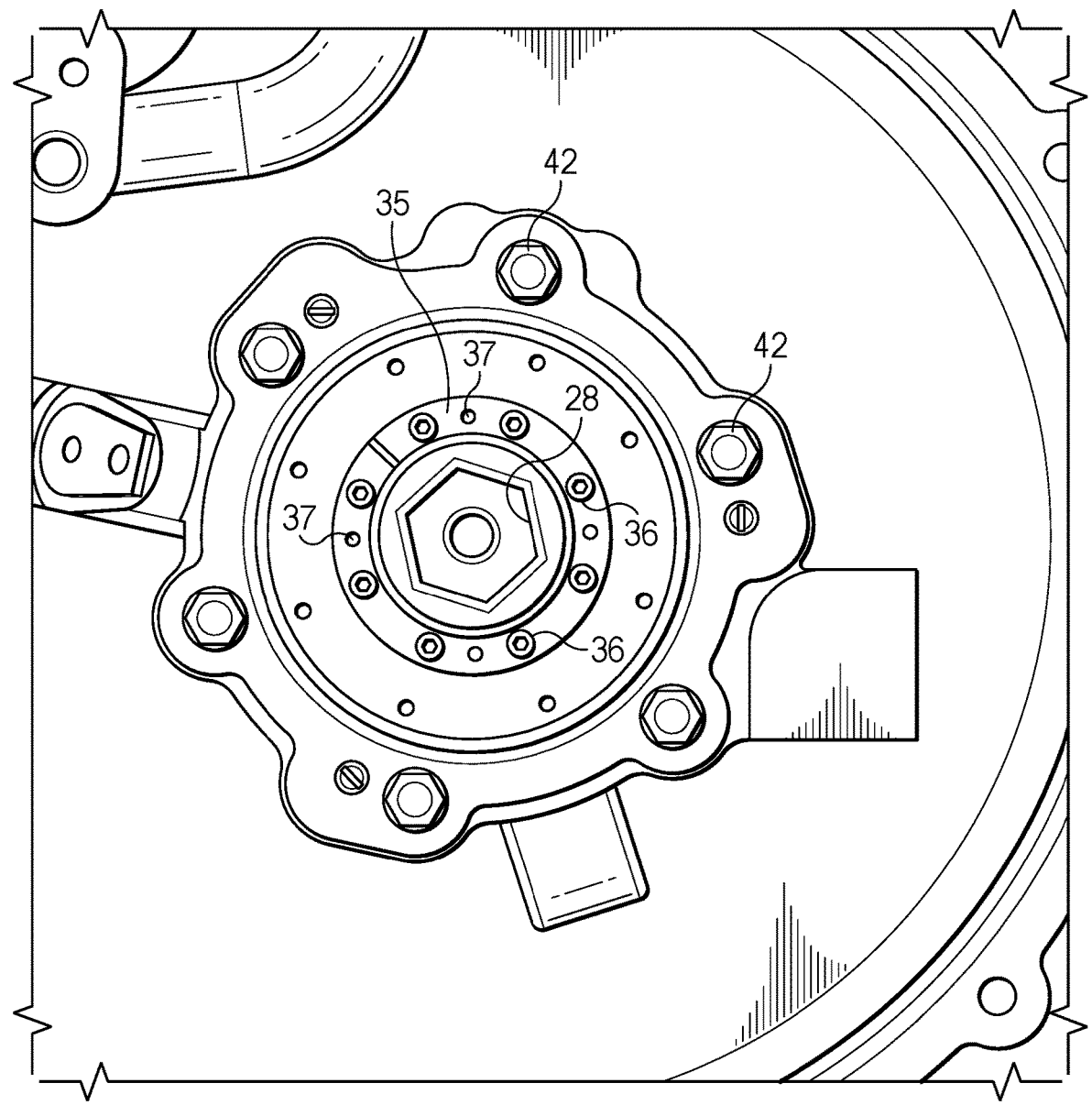
FIG. 4 shows an external view of a lockout device and gearbox embodiment under the present disclosure.

Further description of the movement of shaft 25 and the lockout device 20 can be provided with respect to FIGS. 2, 3 and 4. Reference numbers are kept consistent between FIGS. 2 to 4 so as to assist in illustrating the movement of the described components. FIG. 2 shows a view of lockout device 20 unengaged from teeth 58 of gearbox 10. FIG. 3 shows a view of lockout device 20 engaged in teeth 58. FIG. 4 shows a view of lockout device 20 from outside of gearbox 10.

Screws 48 (shown in ghost form in FIGS. 3 and 4 because they would be removed with the cover 45) are used to couple housing 40 to cover 45 and can be removed when a lockout operation is desired. Bolts 42 couple housing to gearbox 10. Hex screws 36 couple inner collar 35 to outer collar 30. Ring 21 along shaft 25 prevents the leftward movement (in this view) of inner collar 35 along the exterior of shaft 25. Additionally, ring 21 can prevent shaft 25 from being pressed too far into gearbox 10. Once a user has removed cover 45, the user may push rightward (in this view) shaft 25 to engage teeth 58. The user can then rotate hex screws 36 (e.g., in a clockwise direction)—this will pull inner collar 35 and outer collar 30 toward each other. In the view shown, inner collar 35 will move right with regard to outer collar 30 and vice versa. This motion will force inner collar 35 against the surface of shaft 25 and lock the rotation of shaft 25, and by extension gearbox 10 and drive train 59 because shaft 25 is engaged with teeth 58 via teeth 27. The inner collar 35 and outer collar 30 engage each other along line 33, forcing each other in the movements described and thereby causing the locking functionality. Hex screws 36 pass through unthreaded holes in inner collar 35 and engage threaded holes in outer collar 30. The rotation of hex screws 36 pulls outer collar 30 and inner collar 35 together and forces inner collar 35 downward against the shaft 25.

Holes 37 in inner collar 35, visible in FIG. 4, can be threaded. Screws or bolts placed here can be screwed in and can engage a flat face of outer collar 30. Rotating the screws/bolts sufficiently can push against the outer collar and move inner collar 35 leftward (from the view of FIG. 3) and create additional freedom for the rotation of shaft 25. The screws or bolts used in holes 37 can be hex screws 36. Hex screws 36 can be removed from the threaded holes in outer collar 30 and threaded into holes 37. Removing hex screws 36 from outer collar 30 and threading them into holes 37 can be part of ending a lockout operation and preparing the gearbox for use.

O-ring 18 provides sealing protection to keep any fluids or other material from entering gearbox 10 through the lockout device 20. Rims 43 of housing 40 can be shaped to abut the right edge (in this view) of outer collar 30 and to restrain rightward movement of outer collar 30 and inner collar 35 along shaft 25. Cover 45, or a portion thereof, can be clear or transparent and allow a user to visually inspect a status of lockout device 20. Alternatively, an indicator, such as a toggle or flipped switch due to placement of the lockout device 20 components, can provide a user an indication of the status of lockout device 20 and/or gearbox 10.

As seen in FIG. 2, cover 45 has a ridge 70 that engages slot 72 on shaft 25. While the aircraft is in use and apart from times during lockout operations, ridge 70 and slot 72 hold shaft 25 in place with respect to cover 45 and prevent the engagement of teeth 27 with teeth 58. Housing 40 can comprise a slot or ridge for an o-ring 82 for engaging a portion of gearbox 10 to hold housing 40 stationary with respect to gearbox 10. The o-ring can provide an interference fit, sealing, and/or friction, between the housing and the gearbox. A portion of the interior of housing 40 can be hollow so as to save weight.

Socket head 28 can be hex-shaped for use with a socket wrench when torquing shaft 25 and gearbox 10. Shaft 25 can also comprise threaded hole or receiving slot 29 at the bottom of socket head 28. Threaded hole 29 can be used with a threaded device to pull out shaft 25 if it gets pressed in too far. Socket head 28 can comprise other shapes besides a hexagonal shape. In some embodiments socket head 28 could comprise spline teeth that engage a tool for pulling out shaft 25. Socket head 28 could be square-shaped in other embodiments. Other shapes are possible as well if they allow for torquing the system.

Reference has been made to hex-shaped receiving components, or screws, bolts, screw-driver compatible components, Phillips head compatible components, etc. While the Figures show certain embodiments, other shaped components can be used. For example, a hex-shaped socket head 28 is shown. But other embodiments could comprise a pentagonal-shaped head, Phillips screwdriver head, proprietary-shaped head, spline teeth that can be engaged, and other styles. The current disclosure is not limited to a specific set up regarding the use of hex or other shaped or compatible components.

Figure 5:
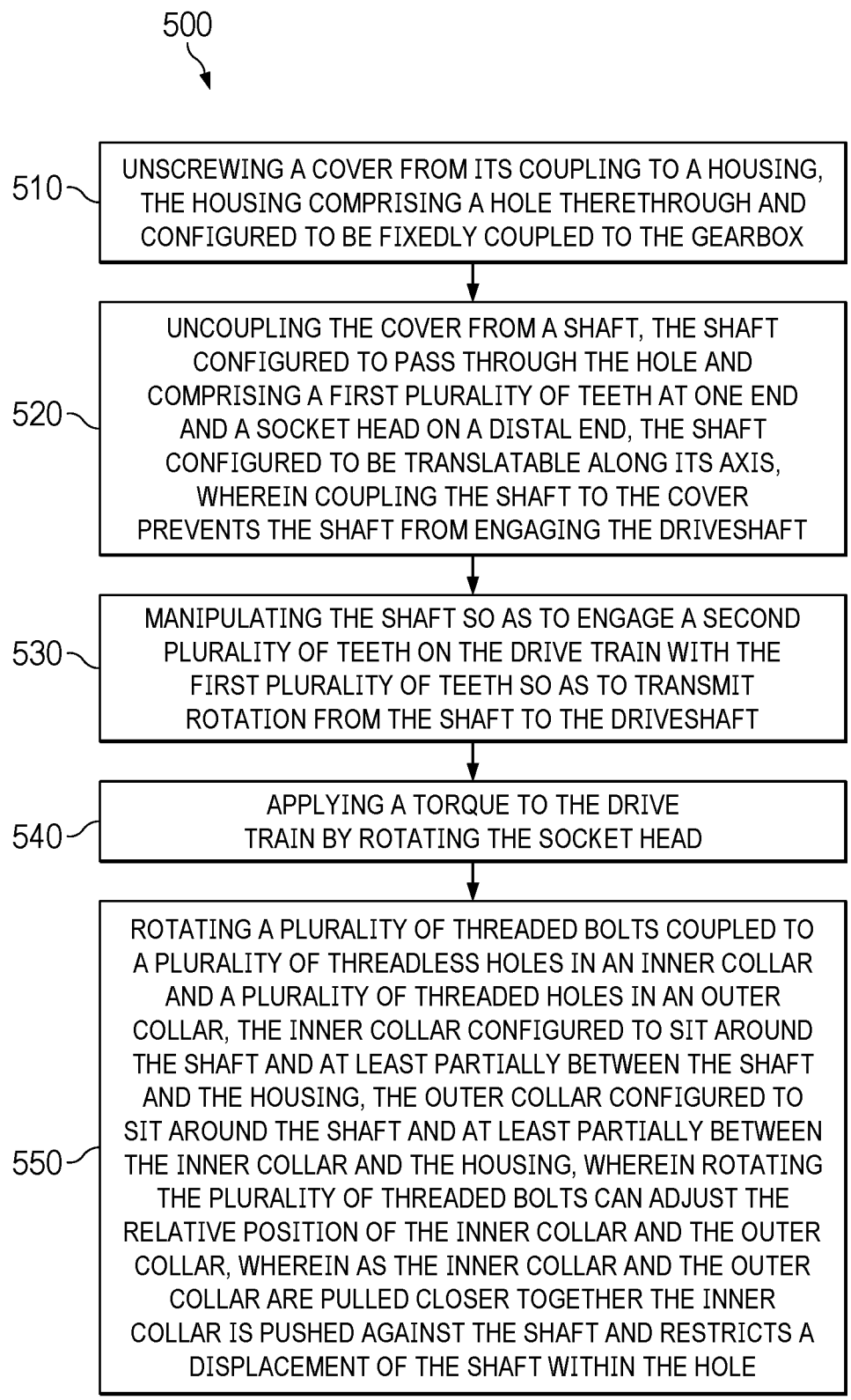
FIG. 5 shows a flow-chart of a method embodiment under the present disclosure.

FIG. 5 shows a method embodiment 500 under the present disclosure. Step 510 is unscrewing a cover from its coupling to a housing, the housing comprising a hole therethrough and configured to be fixedly coupled to the gearbox. Step 520 is uncoupling the cover from a shaft, the shaft configured to pass through the hole and comprising a first plurality of teeth at one end and a socket head on a distal end, the shaft configured to be translatable along its axis, wherein coupling the shaft to the cover prevents the shaft from engaging the drive train. Step 530 is manipulating the shaft so as to engage a second plurality of teeth on the drive train with the first plurality of teeth so as to transmit rotation from the shaft to the drive train. Step 540 is applying a torque to the drive train by rotating the socket head. Step 550 is rotating a plurality of threaded bolts coupled to a plurality of threadless holes in an inner collar and a plurality of threaded holes in an outer collar, the inner collar configured to sit around the shaft and at least partially between the shaft and the housing, the outer collar configured to sit around the shaft and at least partially between the inner collar and the housing, wherein rotating the plurality of threaded bolts can adjust the relative position of the inner collar and the outer collar, wherein as the inner collar and the outer collar are pulled closer together the inner collar is pushed against the shaft and restricts a displacement of the shaft within the hole.

FIGS. 6 to 12 can help illustrate additional views of a lockout device embodiment and the performance of a lockout procedure and ending the lockout for use of the aircraft.

Figure 6:
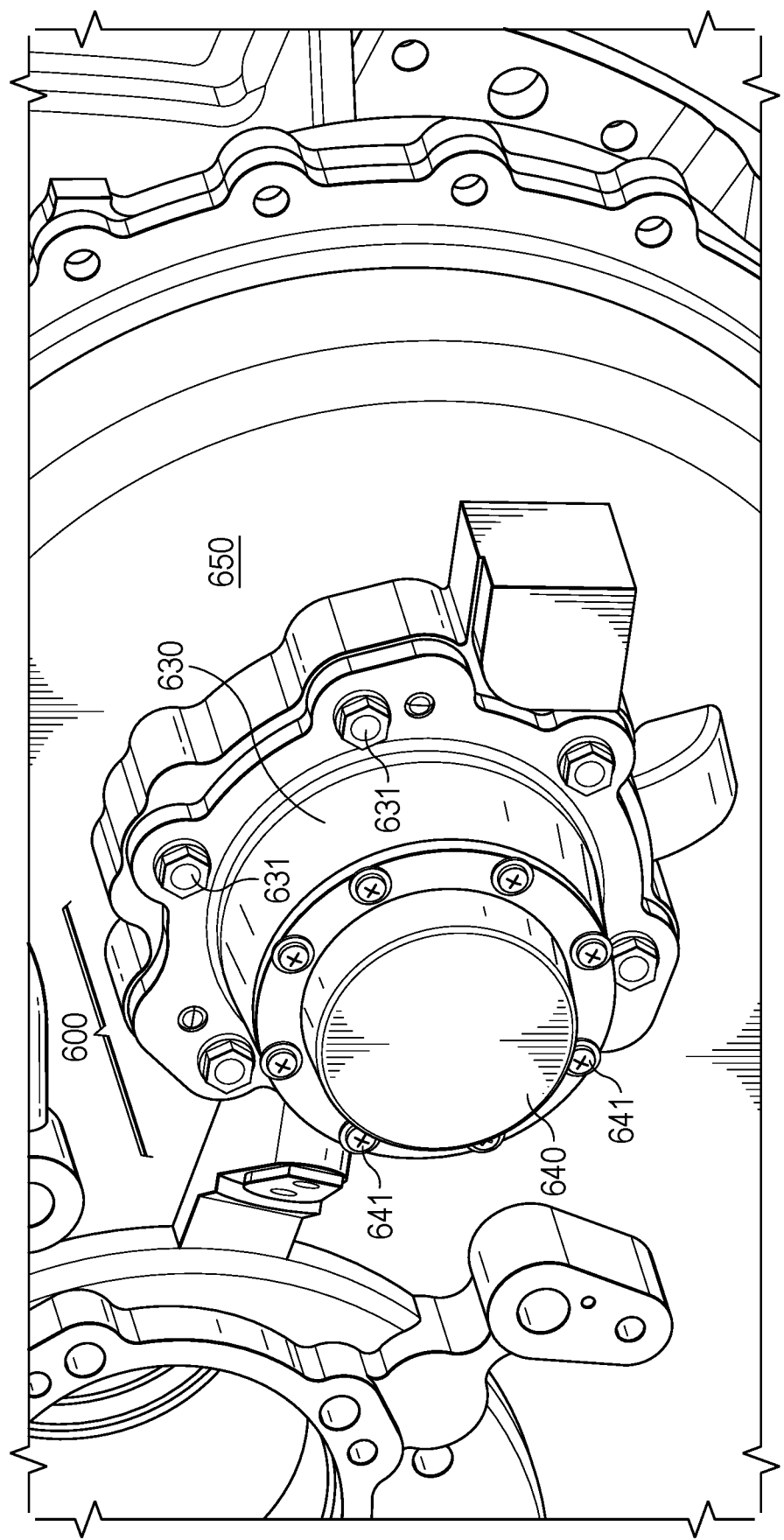
FIG. 6 shows a lockout device and gearbox embodiment under the present disclosure.

FIG. 6 displays lockout device 600, comprising a housing 630 and cover 640, coupled to gearbox 650. Bolts 641 couple cover 640 to housing 630. Bolts 631 couple housing 630 to gearbox 650.

Figure 7:
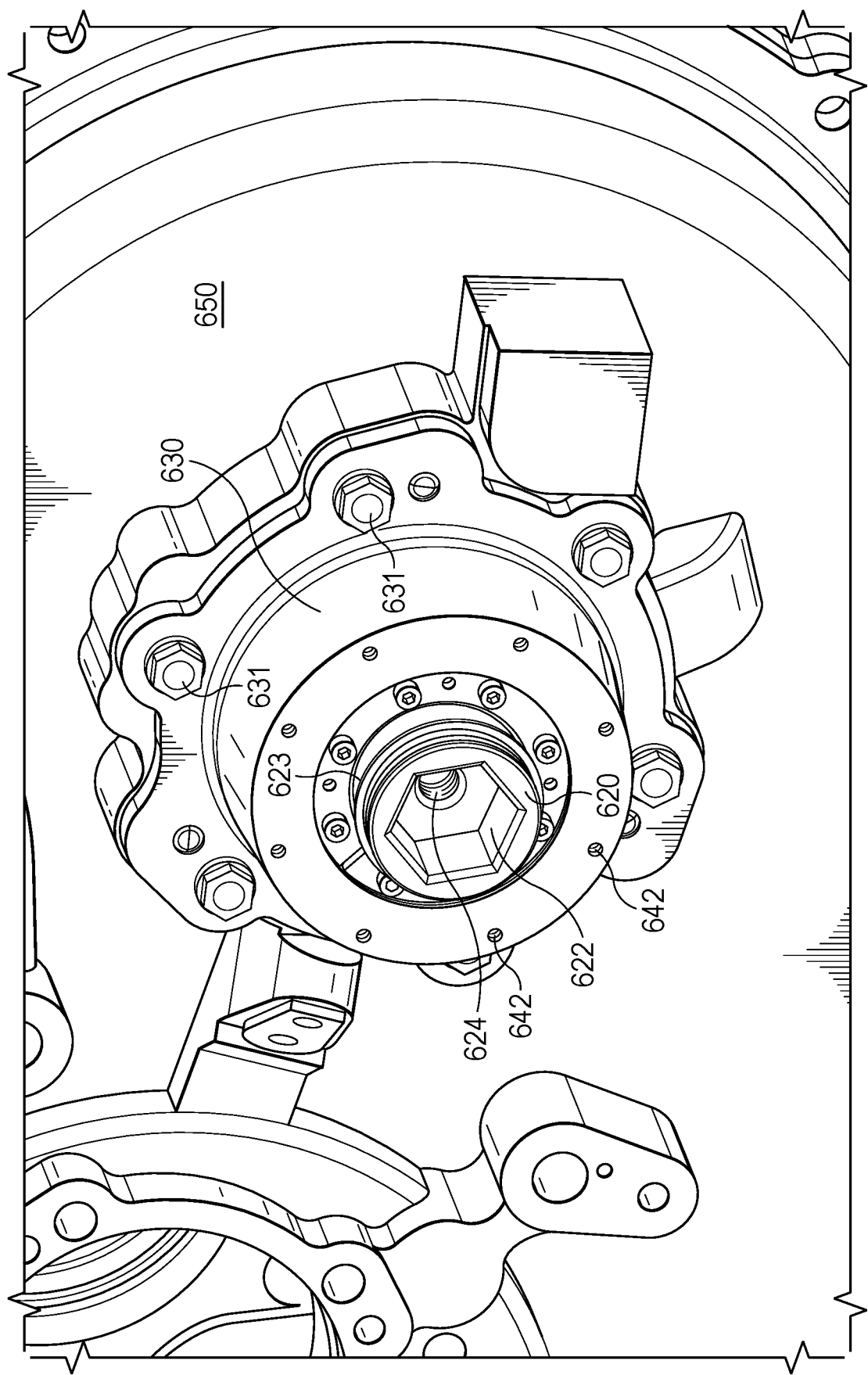
FIG. 7 shows a lockout device and gearbox embodiment under the present disclosure.

Bolts 641 can be removed to begin a lockout procedure. As seen in FIG. 7, cover 640 has been removed. Holes 642 on housing 630 are now empty after the removal of bolts 641. Shaft 620 can now be seen. Socket head 622, ring 623, and threaded hole 624 are also seen. Inner collar 660 is seen with threaded bolts 665 that couple inner collar 660 to outer collar 670 (not shown in FIG. 7). Threaded holes 667 are shown, empty right now but available to receive threaded bolts 665 to assist in pushing inner collar 660 away from outer collar 670.

Figure 8A:
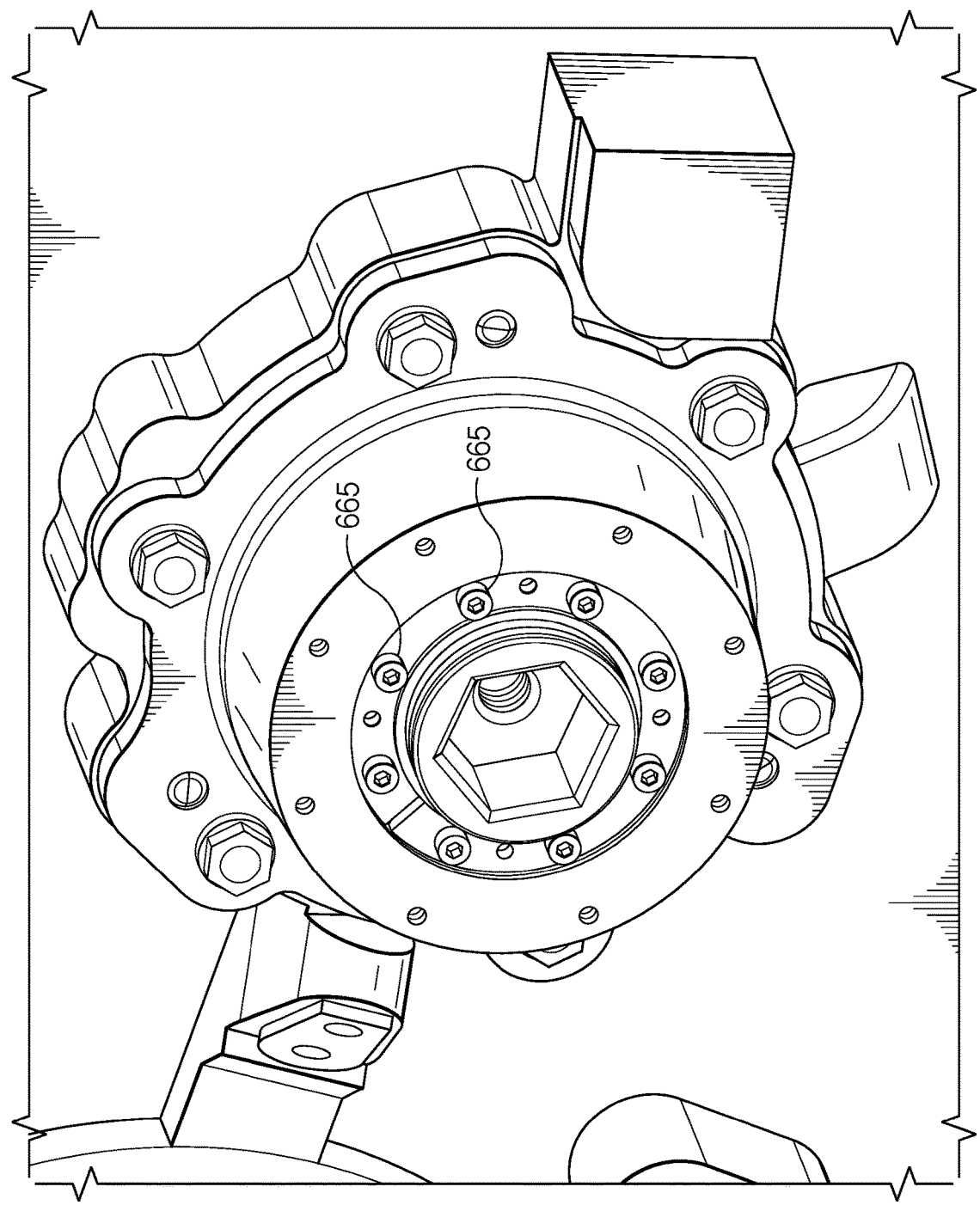
FIGS. 8A-8B show a lockout device and gearbox embodiment under the present disclosure.
Figure 8B:
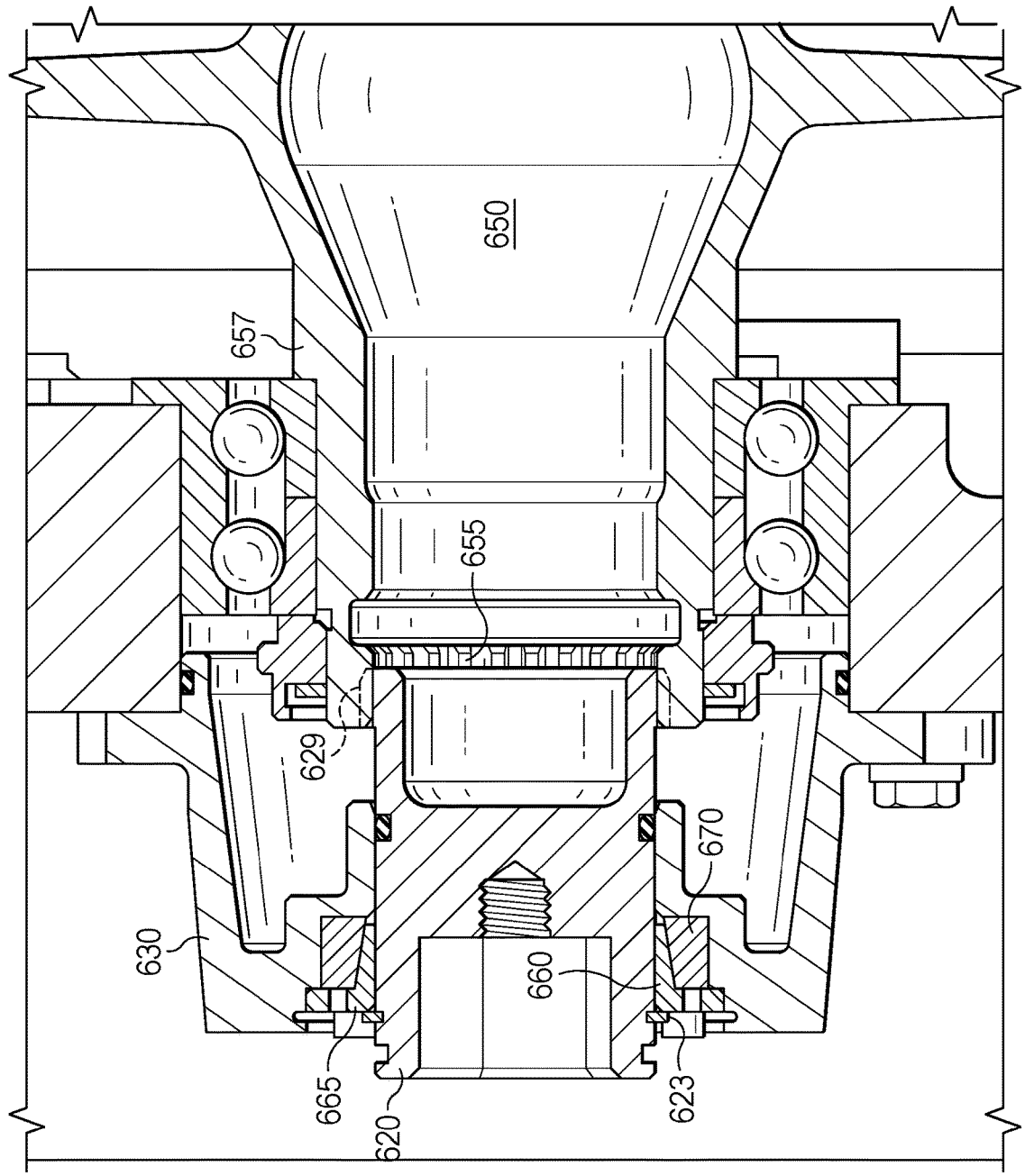

Referring to FIGS. 8A-8B, threaded bolts 665 can be loosened, which will loosen the grip of inner collar 660 and outer collar 670 on shaft 620. Referring to FIG. 8B, shaft 620 can now be pushed axially into gearbox 650 so as to engage gear 655. Shaft 620 can comprise teeth 629 that engage gear 655. Gear 655 can comprise a portion of a drive train 657. Ring 623 on shaft 620 prevents the shaft 620 from being pressed too far into gearbox 650.

Figure 9A:
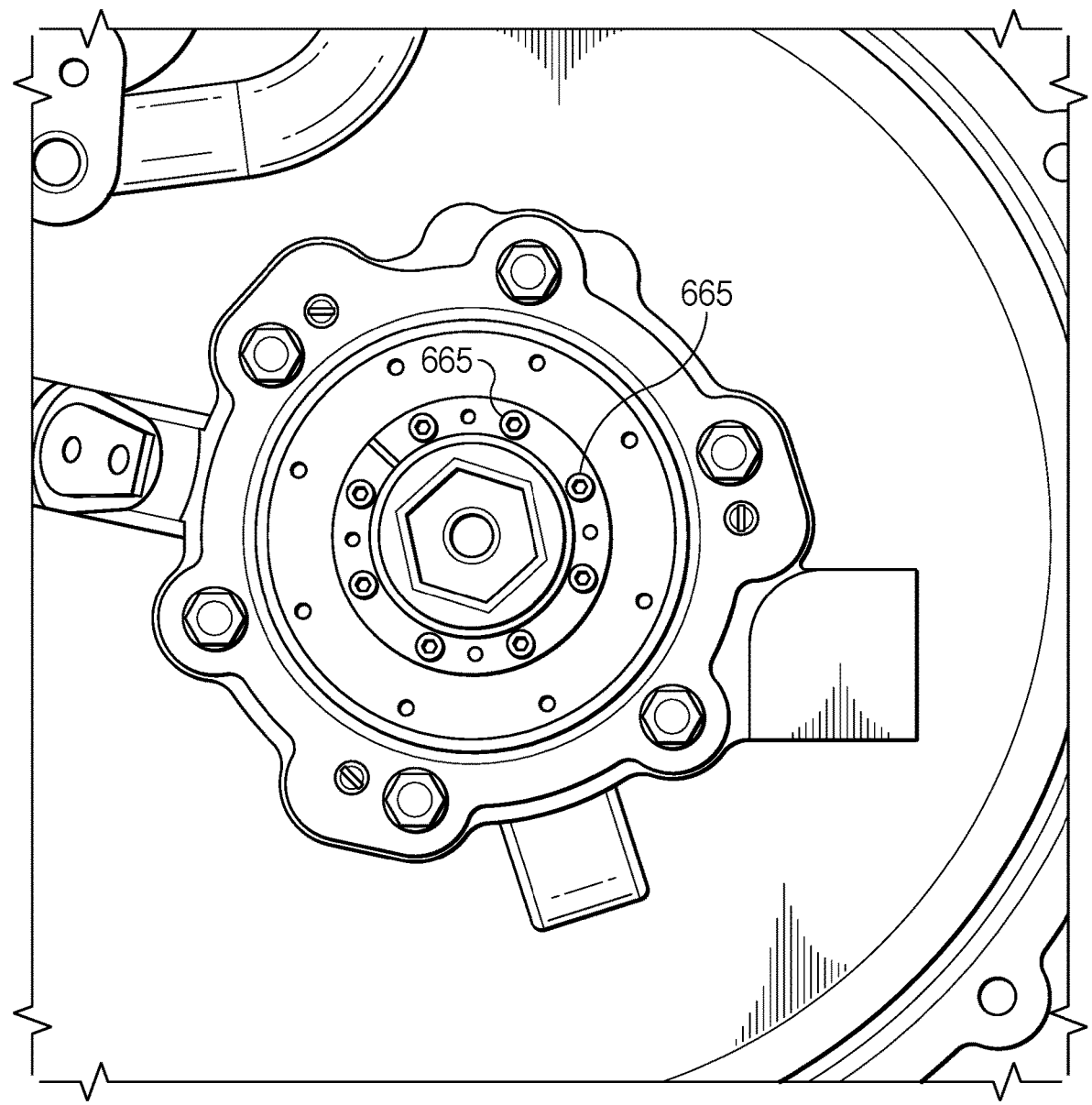
FIGS. 9A-9B show a lockout device and gearbox embodiment under the present disclosure.
Figure 9B:
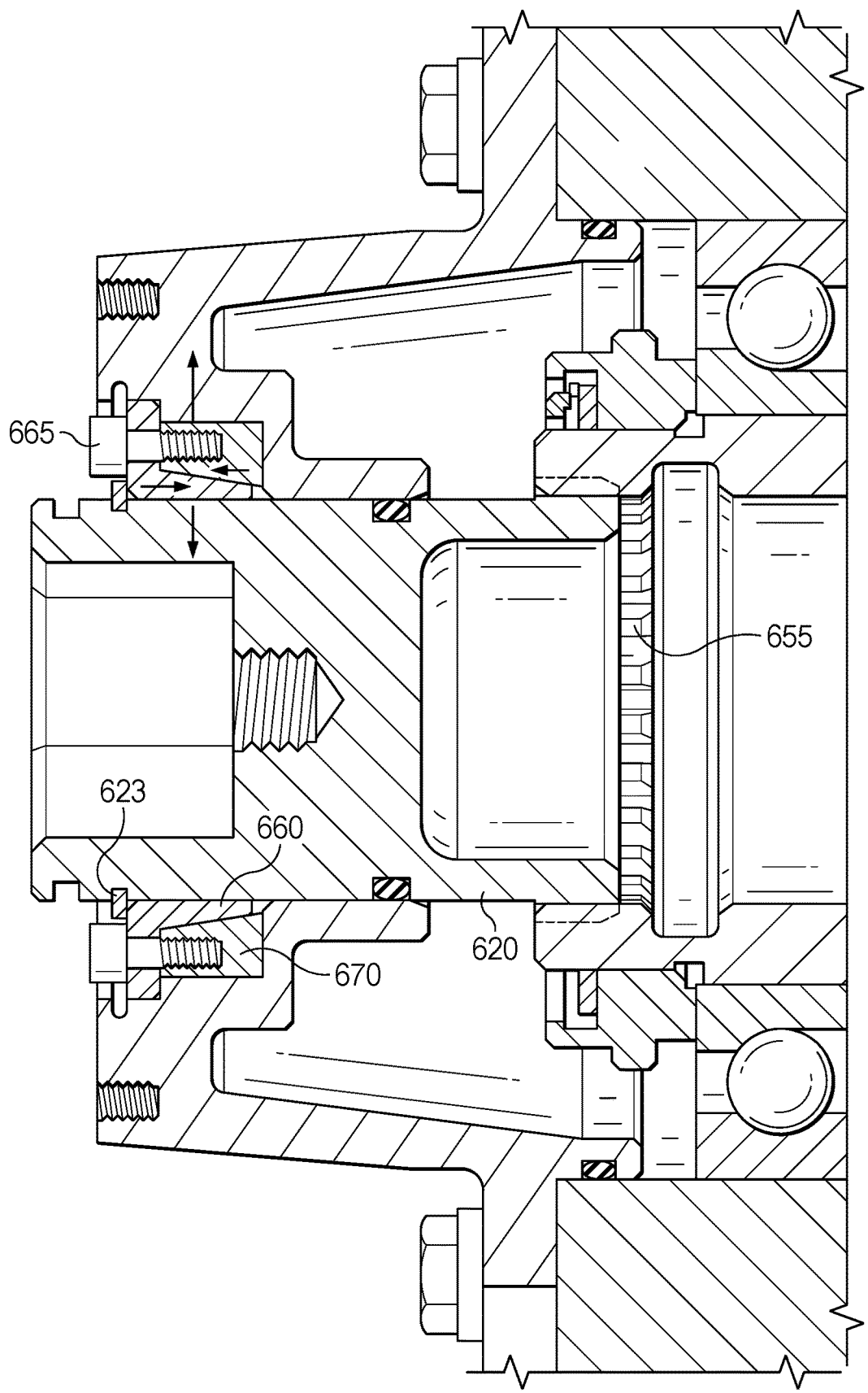

Moving to FIGS. 9A-9B, after shaft 620 has been moved to engage gear 655, threaded bolts 665 can be tightened, drawing outer collar 670 and inner collar 660 closer together and pushing inner collar 660 more tightly around shaft 620. After sufficient tightening (FIG. 9B) the shaft 620 will be "locked" in gear 655. Cover 640 can be reattached and the vehicle and/or gearbox can be shipped, undergo maintenance or storage, or as otherwise desired.

Figure 10:
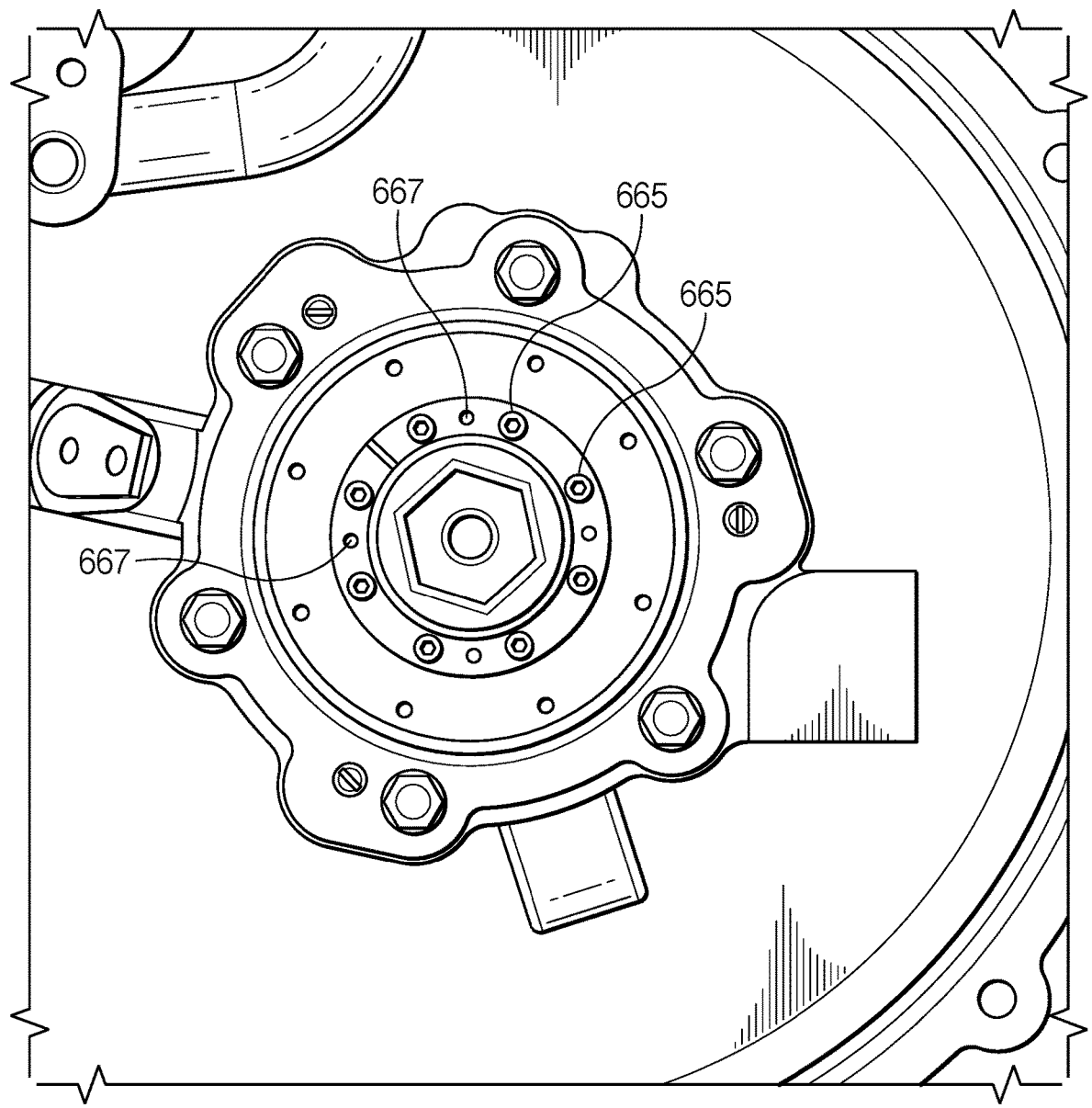
FIG. 10 shows a lockout device and gearbox embodiment under the present disclosure.
Figure 11:
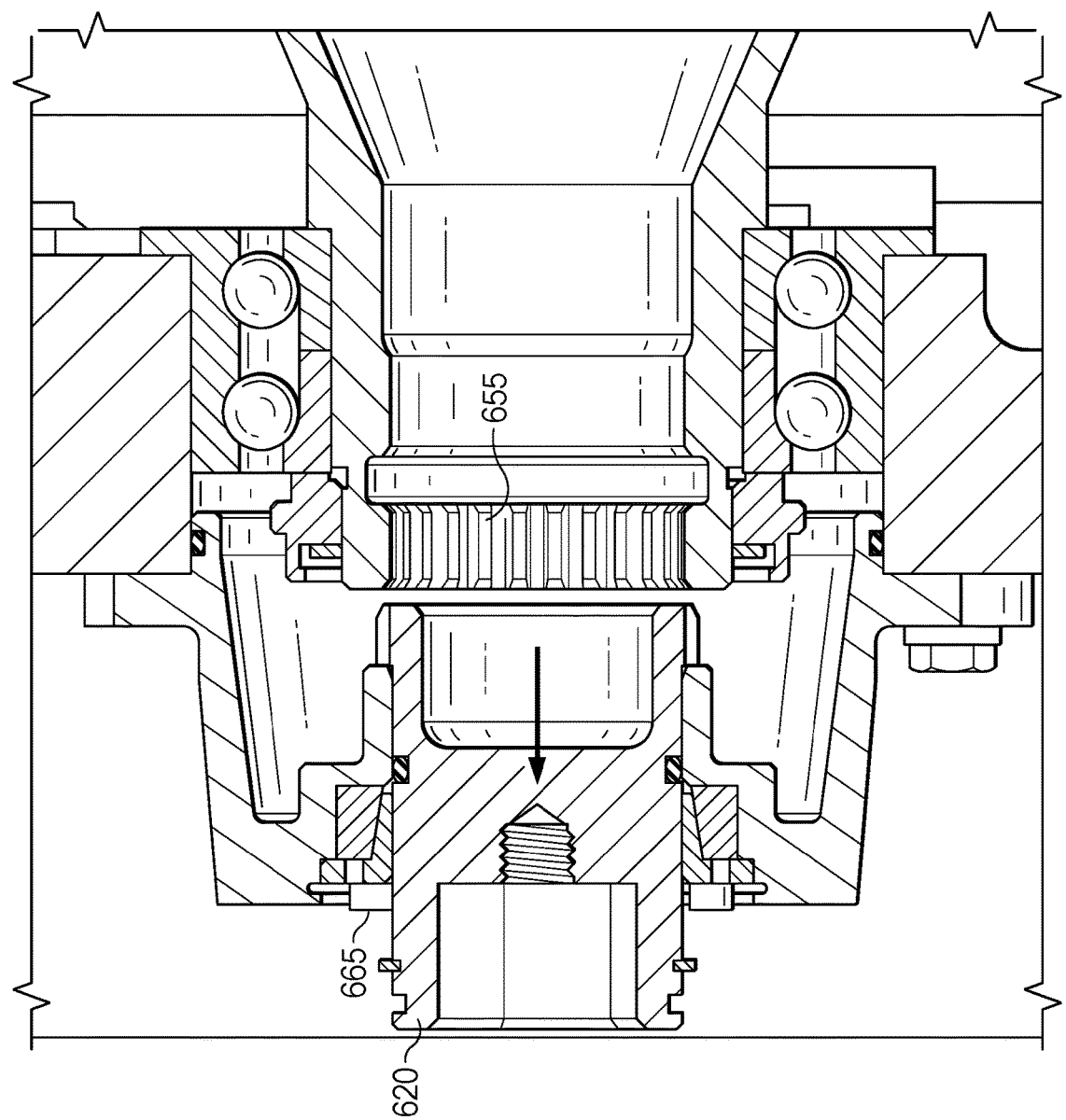
FIG. 11 shows a lockout device and gearbox embodiment under the present disclosure.
Figure 12:
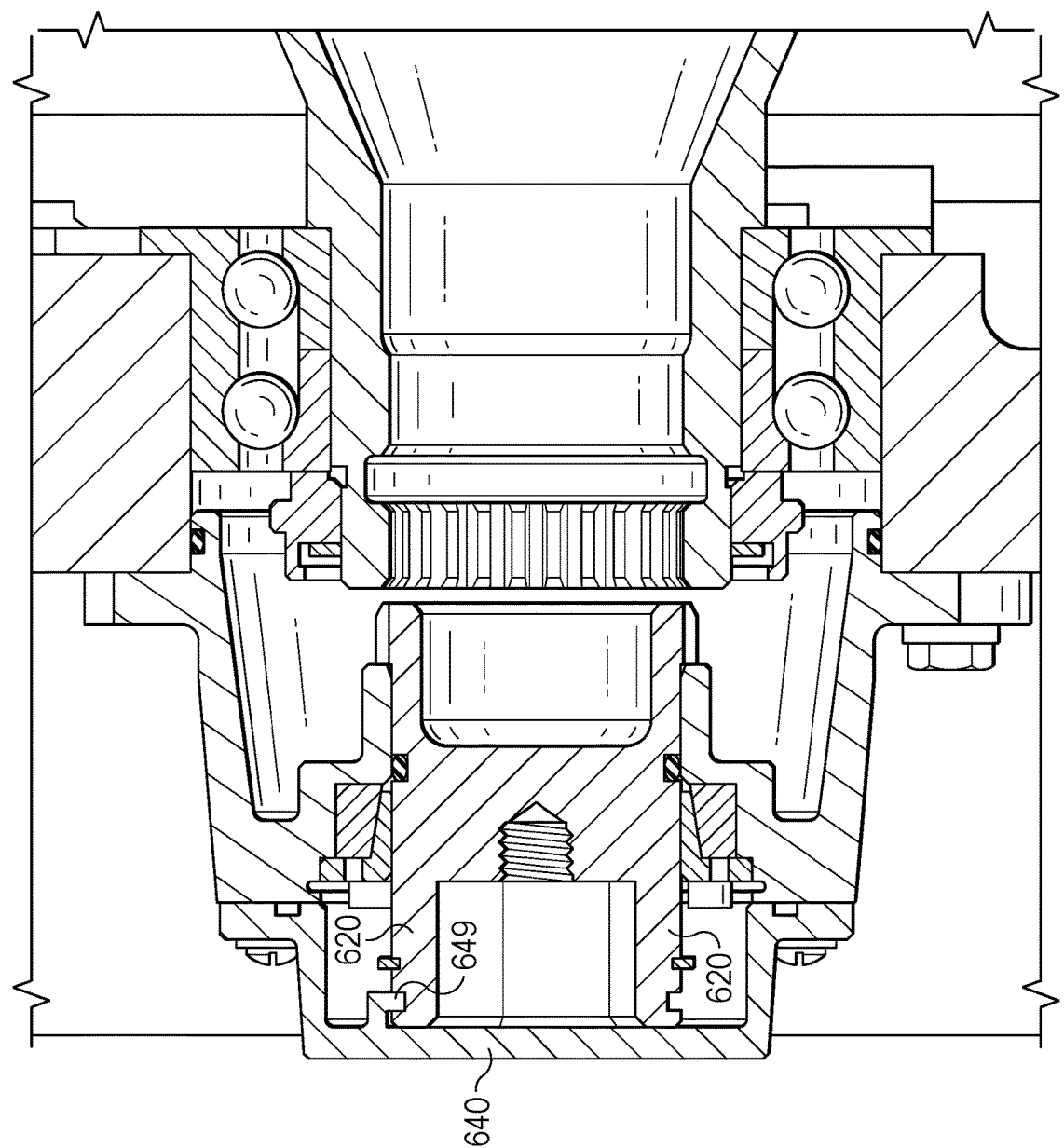
FIG. 12 shows a lockout device and gearbox embodiment under the present disclosure.

When the user desires to end the lockout procedure, the cover 640 can be removed again. As seen in FIG. 10, threaded bolts 665 can be removed from outer collar 670 and be threaded into threaded holes 667. Using the threaded bolts 665 in threaded holes 667 will cause the tip of the threaded bolts 665 to press against a flat surface of outer collar 670 and thereby press inner collar 660 and outer collar 670 apart from each other and reduce grip on the shaft 620. Shaft 620 can now be pulled away from gear 655, allowing the gearbox 650 and drive train 657 to be operable for flight or other vehicle usage. Threaded bolts 665 can be retrieved from threaded holes 667 and reinserted into the inner collar 660 and outer collar 670 and tightened to "lock" the shaft in the unengaged position. Collar 640 (FIG. 12) can then be reattached to housing 630. Coupling 649 between collar 640 and shaft 620 can help hold shaft 620 in its locked and unengaged position so that it does not touch or engage gear 655 or drive train 657 during operation.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

CONCLUSION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by preferred embodiments, exemplary embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A lockout device for a gearbox, comprising:
   a housing;
   a shaft comprising a first plurality of teeth at a first end, the first plurality of teeth being configured to engage a second plurality of teeth on a drive train within the gearbox and transmit rotation from the shaft to the drive train;
   an inner collar configured to sit around the shaft, the inner collar further configured to sit at least partially between the shaft and the housing, the inner collar comprising a plurality of threadless holes; and
   an outer collar configured to sit around the shaft and at least partially between the inner collar and the housing, the outer collar comprising a plurality of threaded holes configured to receive a plurality of bolts passing through the plurality of threadless holes, wherein rotation of the plurality of bolts can adjust a relative position of the inner collar and the outer collar, wherein as the inner collar and the outer collar are pulled closer together the inner collar is pushed against the shaft and restricts a displacement of the shaft with respect to the housing.

2. The lockout device of claim 1, further comprising a cover configured to be detachably coupled to both the housing, and to the shaft.

3. The lockout device of claim 1, wherein the inner collar comprises a second plurality of threaded holes configured to allow a second plurality of bolts to pass therethrough and engage a surface of the outer collar.

4. The lockout device of claim 1, further comprising a ring configured to sit in a recess on the shaft and engage an edge of the inner collar and prevent further displacement of the shaft.

5. The lockout device of claim 1, the housing comprising a rim, wherein the outer collar is configured to engage the rim, the rim being proximate a hole of the housing and configured to restrict displacement of the outer collar.

6. The lockout device of claim 1, further comprising an o-ring configured to seal a gap between the shaft and the housing.

7. A lockout device for use in driving, torquing, and locking a drive train in a gearbox, comprising:
   (a) a housing;
   (b) an o-ring configured to seal a gap between a shaft and the housing;
   (c) the shaft comprising
      (i) a plurality of teeth at a first end configured to engage a portion of the drive train within the gearbox and to transmit rotation from the shaft to the drive train; and
      (ii) a receiving slot at a second end distal to the first end and configured to receive a tool for rotation of the shaft.

8. The lockout device of claim 7, further comprising a ring configured to sit in a recess on the shaft and engage an edge of an inner collar and prevent displacement of the shaft with respect to the inner collar.

9. The lockout device of claim 7, wherein the receiving slot comprises a socket head shape configured to receive a socket therein and allow the socket to rotate the shaft.

10. The lockout device of claim 7, wherein the shaft further comprises a second receiving slot at a bottom of the receiving slot, the second receiving slot comprising at least one of: a hexagonal shape; a square shape; threads; a tool spline.

11. The lockout device of claim 7, further comprising a detachable cover having a ridge, the shaft further comprising a slot configured to receive the ridge of the detachable cover.

12. A method of performing a lockout operation to torque and lock a drive train within a gearbox, the method comprising:
   manipulating a shaft comprising a first plurality of teeth at a first end so as to engage a second plurality of teeth on a drive train with the first plurality of teeth;
   applying a torque to the drive train by rotating the shaft at a second end comprising a receiving slot; and
   rotating a plurality of threaded bolts coupled to a plurality of threadless holes in an inner collar and a plurality of threaded holes in an outer collar, the inner collar configured to sit around the shaft and at least partially between the shaft and a housing, the outer collar configured to sit around the shaft and at least partially between the inner collar and the housing, wherein rotating the plurality of threaded bolts can adjust a relative position of the inner collar and the outer collar, wherein as the inner collar and the outer collar are pulled closer together the inner collar is pushed against the shaft and restricts a displacement of the shaft within the housing.

13. The method of claim 12 further comprising, prior to the manipulating, rotating a plurality of threaded members through a second plurality of threaded holes in the inner collar, the second plurality of threaded holes configured to allow the plurality of threaded members to pass therethrough and engage a flat surface of the outer collar to push the inner collar and outer collar away from each other, wherein as the inner collar and the outer collar are pushed away from each other the shaft is given greater freedom of movement along its axis.

14. The method of claim 12, wherein manipulating the shaft comprises moving the shaft toward the drive train until the inner collar stops a movement of a ring comprising the shaft.

15. The method of claim 12, further comprising re-attaching a cover to the housing.

16. The method of claim 12, further comprising threading a threaded member into a threaded slot at a bottom of the receiving slot and pulling the shaft out of the drive train with the threaded member.

17. The method of claim 12, further comprising checking a status of the shaft by at least one of: looking through a transparent portion of a cover coupled to the shaft; checking an indicator switch or bottom that shows when the cover is engaged to the shaft; checking an electric sensor; checking an electric switch.

\* \* \* \* \*